United States Patent
Grewe

(10) Patent No.: US 6,478,100 B1
(45) Date of Patent: Nov. 12, 2002

(54) SUPERCHARGED HYBRID ELECTRIC VEHICLE

(75) Inventor: Timothy Michael Grewe, Endicott, NY (US)

(73) Assignee: Bae Systems Controls, inc., Johnson City, NY (US)

( * ) Notice: Subject to any disclaimer, the term of this patent is extended or adjusted under 35 U.S.C. 154(b) by 0 days.

(21) Appl. No.: 09/369,086

(22) Filed: Aug. 5, 1999

(51) Int. Cl.[7] .............................................. B60K 6/02
(52) U.S. Cl. ..................... 180/65.2; 180/68.2; 180/68.3
(58) Field of Search ........................... 180/65.2, 65.3, 180/65.4, 68.1, 68.2, 68.3; 123/26, 198 R; 310/63

(56) References Cited

U.S. PATENT DOCUMENTS

| | | | | |
|---|---|---|---|---|
| 4,331,209 A | * | 5/1982 | Bauer et al. ................ | 180/68.1 |
| 4,896,734 A | * | 1/1990 | Horiuchi et al. ........... | 180/68.3 |
| 5,418,399 A | | 5/1995 | Klaue ......................... | 290/1 R |
| 5,432,413 A | * | 7/1995 | Duke et al. ............. | 180/65.4 X |
| 5,561,359 A | * | 10/1996 | Matsuura et al. ...... | 180/68.2 X |
| 5,828,201 A | | 10/1998 | Hoffman, Jr. et al. ...... | 320/104 |
| 5,869,950 A | | 2/1999 | Hoffman, Jr. et al. ...... | 320/103 |
| 5,937,960 A | * | 8/1999 | Dewey ....................... | 180/68.3 |
| 5,975,227 A | * | 11/1999 | Vlad .......................... | 180/65.4 |

* cited by examiner

*Primary Examiner*—Michael Mar
(74) *Attorney, Agent, or Firm*—William H. Meise; Geoffrey H. Krauss

(57) ABSTRACT

A hybrid electric vehicle (10) includes an internal combustion engine (12) which drives a generator (20) to produce electrical energy for a traction motor (44) of the vehicle. The generator (20) is provided with a cooling air intake port (20*i*). A air mover or compressor (30) is driven from the engine (12) or from an auxiliary motor (84), to produce air under positive pressure. The air from the air mover (30) is coupled by air paths (60, 62, 64) to the cooling air input port (20*i*) of the generator (20) and to the combustion air aspiration or input port (16) of the engine (12). If the air mover serves the purpose of cooling the generator (20) and, if a non-positive-displacement pump, also provides an effect similar to turbocharging, and if a positive-displacement type, supercharges the engine (12).

9 Claims, 2 Drawing Sheets

SUPERCHARGED HYBRID ELECTRIC VEHICLE

FIELD OF THE INVENTION

This invention relates to hybrid electric vehicles, and more particularly to such vehicles using an internal combustion engine which receives combustion air under pressure.

BACKGROUND OF THE INVENTION

Enhancement of the operation of internal combustion engines by the use of superchargers has been known for almost a century. In general, a supercharger is an air pump which is driven by the engine, and which compresses the air provided to the air intake port of the engine. The air pump of a supercharger is often described as being "positive-displacement," to thereby indicate that a fixed volume of air is move during each rotation of the compressor shaft. Compression of the air provided to the intake manifold allows a greater mass of air to be forced into each cylinder during the intake portion of the operating cycle, which in turn allows combustion of a greater mass of fuel during each cycle of operation. This improves the "volumetric efficiency" or the amount of power which can be produced by each increment of displaced volume. More power can be produced by an engine operating with a supercharger than by a corresponding engine lacking a supercharger.

It was discovered that supercharging an engine did indeed increase the output power or torque, but it also increased the stresses on engine parts, which tended to contribute to a lesser reliability. The power gains achieved by a supercharger tended to be less than expected, because of the shaft power consumed by the air compressor itself. A concomitant of the use of a supercharger to improve the volumetric efficiency an increase in the fuel consumption per displaced volume, because the ratio of fuel to air remains relatively constant for proper combustion. In general, it was found to be more practical to achieve increased power by a conventionally aspirated engine of larger displacement than by a supercharged engine.

Turbocharging was devised as a method for achieving some of the gains of supercharging, without attendant disadvantages. A turbocharger is an air compressor, generally centrifugal, which is driven by a turbine associated with the exhaust of the internal combustion engine. The exhaust gases drive the turbine, which spins the centrifugal compressor, and the resulting compressed air is provided to the air intake port of the engine to provide improved volumetric efficiency.

As with superchargers, turbochargers were found to be less than perfect. Early turbocharged vehicles suffered from carbonization of lubricating oil in the turbine due to the heat of the exhaust gases driving the turbine, and this effect was found to be most egregious when the engine was turned off, as the oil "baked" in place, as oil flow stopped concurrently with turning off of the engine. It had initially been anticipated that the energy for driving the turbocharger was "free" in that the drive energy would otherwise be wasted; the effect of the presence of the turbine in the exhaust system of the engine tended to increase the back pressure, which tended to offset the improvement in volumetric efficiency provided by the positive pressure at the air intake port. Another disadvantage of the turbocharger is that of "lag," which refers to reduction of the boost air pressure, during acceleration, relative to what might be expected at a corresponding static engine speed. In other words, the turbine speed lagged the engine speed, due to inertia or possibly other factors. Consequently, the boost air pressure during acceleration, when extra power or torque is needed, was small, while the boost air pressure during cruise was large, but generally unnecessary. These disadvantages resulted in little use of turbochargers in gasoline-powered automobiles.

Since the early 1970s, there has been an emphasis on vehicle fuel mileage. The Government has promulgated fleet mileage requirements in an attempt to reduce overall fuel consumption. In response to the perceived need for improved mileage, automobiles have been made lighter, and engine displacements have been reduced. The reduction in shaft power per operating cycle occasioned by the reduced displacements has been partially overcome by increasing the engine operating speeds. These changes, coupled with modern electronic control systems, has been effective in maintaining perceived automobile performance, while improving fuel mileage.

In an effort to further improve mileage, automotive manufacturers have been experimenting with nonstandard propulsion systems. One proposed vehicle drive system is powered by a tank of compressed air, but this arrangement lacks range, and is not readily "refueled" as its compressed-air tanks require pressures which may exceed those readily available at gas stations. Battery-powered electrically-driven vehicles are available, but are widely recognized as having insufficient range for ordinary use. Improvements in battery technology may one day make such battery-operated vehicles practical. However, the need to recharge the batteries with substantial amounts of energy means that technological and infrastructure changes may be required to provide fast charging at convenient "electric" recharge stations.

A fuel-consuming hybrid electric vehicle has come to be considered more practical than a pure-electric vehicle because of its ability to use conventional liquid-fuel infrastructure, because of its relatively great range, attributable to the relatively high energy density of liquid fuels. The environmental objections to such vehicles appear to be decreasing, as the effects of operation of coal-fired and other electrical generating plants on the environment, attributable to the need to produce the energy to recharge electric vehicles, becomes widely known.

Improved vehicles are desired.

SUMMARY OF THE INVENTION

A hybrid electric vehicle according to an aspect of the invention includes an internal combustion engine which receives fuel, mixes the fuel with air from an air intake port to thereby form a fuel-air mixture, and combusts the fuel-air mixture to rotate a drive shaft. The vehicle also includes an electrically operated traction motor for driving the vehicle. An electrical generator is mechanically coupled to the drive shaft of the engine, for being driven by its rotation. Rotation of the generator, in turn, generates electrical power for use by the traction motor. The traction motor may receive the electrical power directly from the generator, but a preferred arrangement converts alternating current from the generator into direct voltage, which is stored in a traction battery, used by the traction motor, or both. The generator includes a cooling air input port, to which pressurized air is provided for cooling the generator. An air mover is pneumatically coupled to air intake port of the engine and to the cooling air input port of the generator, for creating a positive air pressure, and for coupling the positive air pressure to the air intake port and to the cooling air input port. In a preferred embodiment of the invention, the air mover is mechanically driven from the generator shaft, or ultimately from the drive shaft of the engine by way of any intermediary mechanical arrangement. In another embodiment, the air mover is driven by an auxiliary electrical motor, which is preferably powered from a battery which is recharged by the generator. In one embodiment, the internal combustion engine is a diesel engine.

A method, according to another aspect of the invention, is for operating a hybrid electric vehicle. The method includes the step of rotating a drive shaft of an internal combustion engine by combusting fuel with air from an air intake port. The shaft of an electrical generator is rotated in response to rotation of the drive shaft, for thereby generating electrical power. The traction motor is operated from time to time using electrical power, to drive, or to aid in driving, the vehicle. An air mover or compressor is operated in order to produce compressed air. The compressed air is routed from the air mover to a cooling air input port of the generator and to the air intake port of the engine. According to a preferred mode of the method of the invention, the step of driving the air mover includes the step of coupling mechanical rotation of the drive shaft to a drive shaft of the air mover. This step may include the step of driving an intermediary device, which is preferably the generator shaft. In an alternative mode of the method, the step of driving the air mover includes the step of applying electrical energy to an auxiliary electrical motor mechanically coupled to the air mover. This auxiliary electrical motor may be driven from a battery which is recharged by the generator.

DESCRIPTION OF THE INVENTION

Series hybrid electric vehicles are described in U.S. Pat. No. 5,828,201, issued Oct. 27, 1998 in the name of Hoffman et al. and U.S. Pat. No. 5,869,950, issued Feb. 9, 1999 in the name of Hoffman et al.; allowed patent applications Ser. No. 09/044,669, filed Mar. 20, 1998 in the name of Lyons et al., U.S. Ser. No. 09/044,671 filed Mar. 20, 1998 in the name of Lyons et al., and U.S. Pat. No. 09/039,895 filed Mar. 16, 1998 in the name of Gataric et al.; and in patent applications Ser. No. 09/192,645, filed Nov. 16, 1998 in the name of Jones et al., U.S. Ser. No. 09/044,670, filed Mar. 20, 1998 in the name of Lyons et al., U.S. Ser. No. 09/044,676, filed Mar. 20, 1998 in the name of Lyons et al., U.S. Ser. No. 09/039,896, filed Mar. 16, 1998 in the name of Lyons, U.S. Ser. No. 09/177,011, filed Oct. 22, 1998 in the name of Chady et al., U.S. Ser. No. 09/080,148, filed May 18, 1998 in the name of Lyons et al., and U.S. Ser. No. 09/266,646, filed Mar. 16, 1999 in the name of Gataric. Series-type hybrid electric buses experimenting or using some of this technology are currently in operation as, for example, transit buses in New York. It appears that they are well received.

Figure 1:
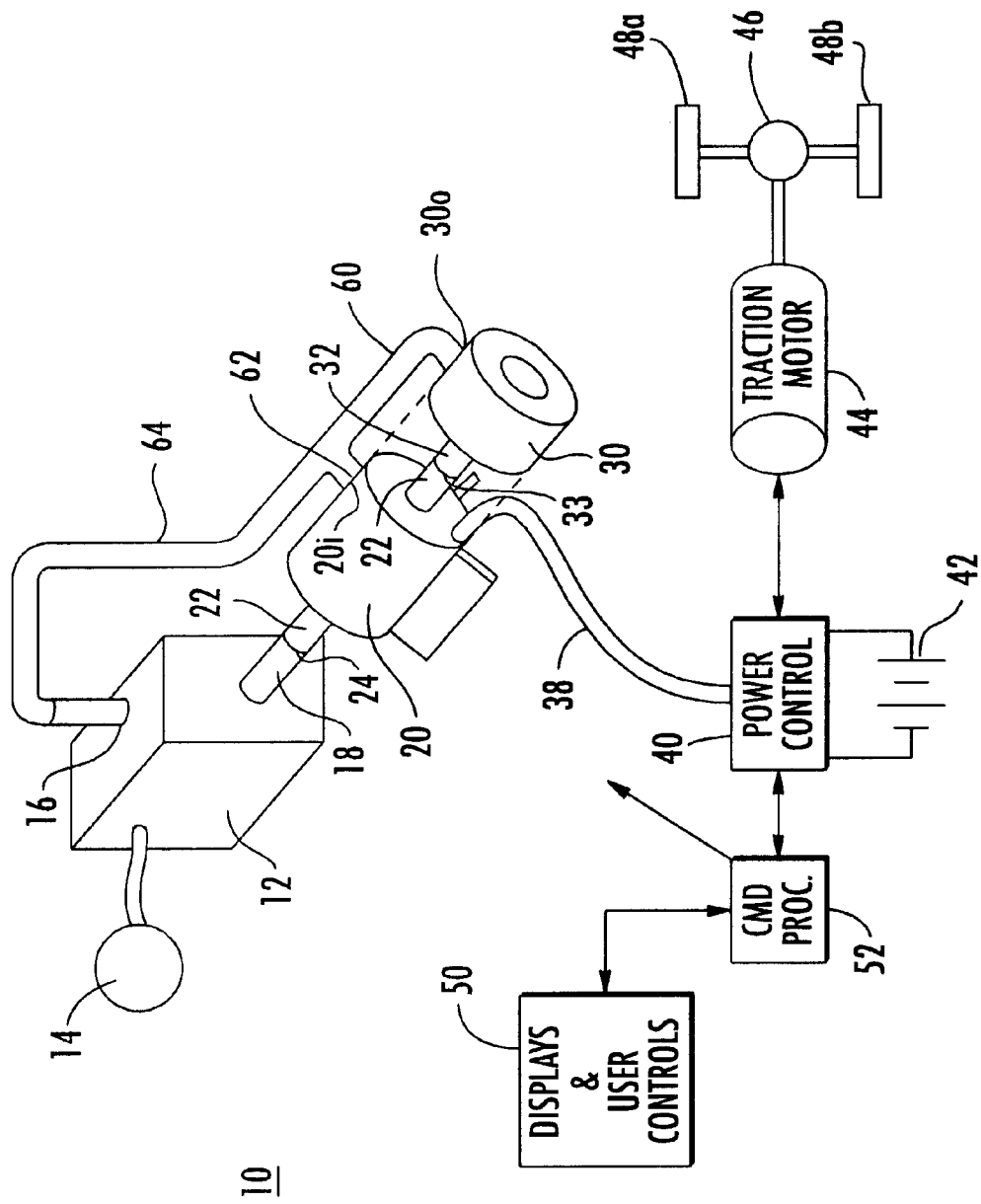
FIG. 1 is a simplified diagram illustrating a vehicle or system according to the invention.

FIG. 1 illustrates a hybrid electric vehicle as generally described in the abovementioned patents documents. In the system of vehicle 10 of FIG. 1, an internal combustion engine 12 is associated with a fuel tank 14. Engine 12 aspires air from an input port 16, and uses the air to combust fuel in the cylinders, in known fashion. The energy produced by the combustion is converted into rotational motion of a drive shaft 18. An alternating-current generator 20 has one end of its shaft 22 connected to shaft 18 at a junction 24, so that the shaft 22 of the generator 20 rotates with rotation of drive shaft 18. A positive-displacement air mover or air compressor 30, has its shaft 32 coupled at a joint 33 to shaft 22 of the generator 20. Thus, there is a direct mechanical connection between engine 12 drive shaft 18 and air compressor 30 shaft 32.

The electric power produced by generator 20 of FIG. 1 is coupled by way of a path illustrated as 38 to a controllable power-handling inverter/converter (inverter) 40. Inverter 40 is also connected to a traction battery illustrated by a conventional battery symbol 42, and to a traction motor/generator (motor) 44. Traction motor 44 is mechanically coupled, by way of differential gearing 46, if desired, to vehicle drive wheels 48a and 48b. The user displays and controls are illustrated as a block 50, The user displays are coupled to a command processor 52, which performs most of the control functions for the vehicle propulsion system, as described in more detail in the abovementioned patents documents.

According to an aspect of the invention, the compressed or positive-pressure air from air mover or air compressor 30 of FIG. 1 is routed as cooling air to generator 20 and to air input port 16 of engine 12. As illustrated in FIG. 1, the air is routed from an air output port 30o, by way of a duct or tube 60 to a tee junction 62. One arm of tee junction 62 connects by way of a further duct or tube 64 to air input port 16 of engine 12, and the other arm of tee junction 62 connects to a cooling air input port 20i of generator 20. In operation, the air mover or air pump 30 operates at the same number of rotations per minute (RPM) as the engine, so cannot be subject to lag. Consequently, boost air pressure can be made available at the air input port 16 of the engine, even at low RPM, by appropriate sizing or dimensioning of the pump in relation to the engine displacement.

The arrangement of FIG. 1 allows use of an air pump for dual use, more specifically for supercharging the engine as well as for cooling the generator. The saving in weight attributable to not having separate air movers is important, considering that fuel savings are very desirable in modern vehicles, and it also contributes to reliability.

Figure 2:
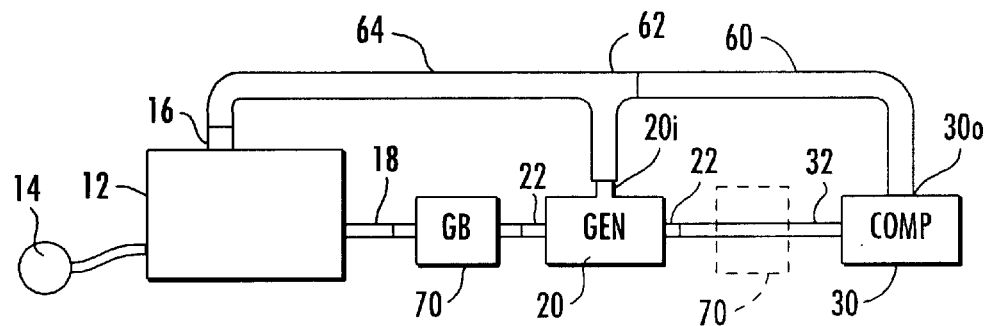
FIG. 2 is a simplified illustration of a portion of the system of FIG. 1, which includes a speed-adjusting gearbox.

FIG. 2 is a simplified illustration of a portion of a system in accordance with an aspect of the invention, which is similar to the system of FIG. 1, but which includes a speed-adjusting gearbox. In FIG. 2, elements corresponding to those of FIG. 1 are designated by like reference numerals. In FIG. 2, a gearbox 70 is interposed between engine shaft 18 and generator shaft 22, for increasing the rotational speed of the generator 20 and compressor 30 by comparison with the rotational speed of engine shaft 18. As an alternative, the gearbox 70 could be placed in the position illustrated by dash lines in FIG. 2, joining the shafts of the generator and the air compressor or air mover 30, to thereby increase the rotational speed of only the air compressor.

Figure 3:
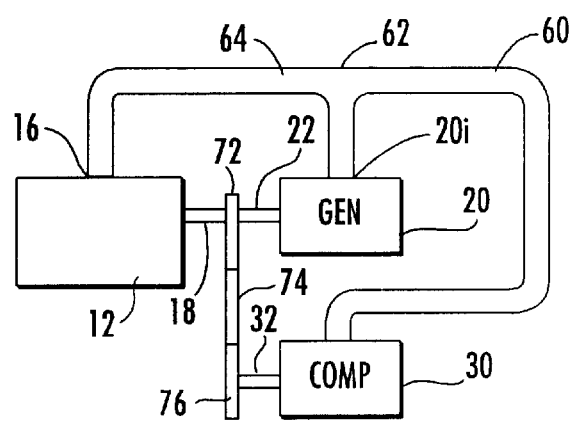
FIG. 3 is a simplified illustration of a mechanical coupling of the shaft of the air mover or air compressor to the drive shaft of the motor in parallel with the connection of the shaft of the generator to the drive shaft of the engine.

The arrangement of FIG. 3 illustrates a mechanical coupling of the shaft of the air mover or air compressor to the drive shaft of the motor in parallel with the connection of the shaft of the generator to the drive shaft of the engine. More particularly, in FIG. 3, a pulley 72 is connected to shafts 18 and 22, and is connected by a belt 74 to a further pulley 76, which drives shaft 32 of the air mover or compressor 30.

Figure 4:
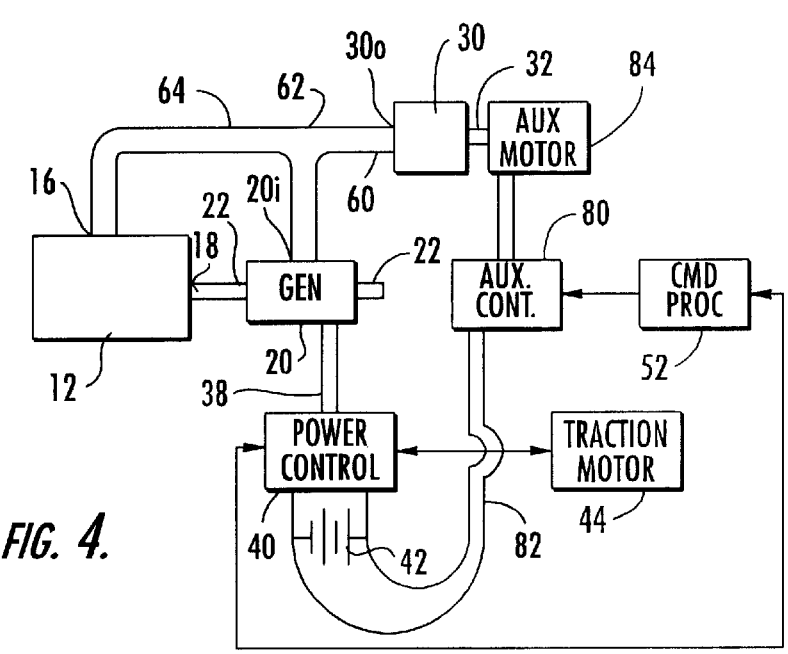
FIG. 4 is a simplified illustration of an arrangement according to an aspect of the invention in which the air mover is driven by an auxiliary electrical motor.

In FIG. 4, the engine 12 shaft 18 drives shaft 22 of generator 20, but the air mover or compressor 30 shaft 32 is driven by an auxiliary electric motor 84. The auxiliary motor 84 is powered by electrical power taken from traction battery 42 by way of a path 82 and an auxiliary controller 80. It should be understood that auxiliary controller 80 is illustrated as separate only for explanation, and it may actually be integrated partially into power controller 40 and partially into command controller 52. Auxiliary controller 80 determines the amount of supercharging boost pressure depending upon conditions; when the engine is off, no boost should be supplied, and when the engine is on, the boost could be constant, or follow some law such as increasing the pressure boost in the presence of an increase in the load or drain from the generator 20.

Other embodiments of the invention will be apparent to those skilled in the art. For example, while the hybrid electric vehicle has been described as a "series" type arrangement in which the internal combustion engine drives only the generator, and the only mechanical traction power comes from the electric motor, the invention may also be used in a "parallel" system in which both the traction motor and the internal combustion engine mechanically drive the vehicle's wheels. While a positive-displacement air mover has been described, the air mover could a centrifugal or other non-positive-displacement type, and could be geared to the engine (or generator) shaft with a gear ratio selected to provide a different range of RPM than for a conventional turbocharger; in such an arrangement, the problem of heating of the air pump by the high-temperature exhaust gases is overcome. While the illustrations show long air paths, such as paths 60 and 62, extending between the air mover and the two air users, the engine air input port 16 and the cooling air input port 20i of generator 20, those skilled in the art know that the presence of such paths tends to impede the flow of air, and that air flow is enhanced if the paths are kept as short as possible, and have the largest possible transverse dimensions. Those skilled in the art also know that compressing air in a compressor such as 30 of the FIGURES tends to heat the air, and that warm air provides less volumetric efficiency than cold air; they also know that may be desirable to cool the compressed air with an intercooler before applying it to the air input or aspiration port 16 of the engine 12.

Thus, the invention lies, in part, in a hybrid electric vehicle (10) which includes an internal combustion engine (12). The internal combustion engine receives fuel (from tank 14), mixes the fuel with air from an air intake port (16) to thereby form a fuel-air mixture, and combusts the fuel-air mixture to rotate a drive shaft (18). The vehicle (10) also includes an electrically operated traction motor (44) for driving the vehicle (10). An electrical generator (20) is mechanically coupled (shaft 22 at joint 33) to the drive shaft (18) of the engine (12), for being driven by its rotation. Rotation of the generator (20), in turn, generates electrical power for use by the traction motor (44). The traction motor (44) may receive the electrical power directly from the generator (20), but a preferred arrangement converts (by controller 52 and power control 40) alternating current from the generator (20) into direct voltage, which is stored in a traction battery (42), used by the traction motor (44), or both. The generator (20) includes a cooling air input port (20i), to which pressurized air is provided for cooling the generator (20). An air mover (30) is pneumatically coupled to air intake port (16) of the engine (12) and to the cooling air input port (20i) of the generator (20), for creating a positive air pressure, and for coupling the positive air pressure to the air intake port (16) and to the cooling air input port (20i). In a preferred embodiment of the invention, the air mover (30) is mechanically driven (by way of shaft 22, or by way of pulleys 72 and 76, and belt 74) from the generator (20) shaft, or ultimately from the drive shaft (18) of the engine (12) by way of any intermediary mechanical arrangement. In another embodiment, the air mover (30) is driven by an auxiliary electrical motor (84), which is preferably powered from a battery (42) which is recharged by the generator (20) (20). In one embodiment, the internal combustion engine (12) is a diesel engine (12).

A method, according to another aspect of the invention, is for operating a hybrid electric vehicle (10). The method includes the step of rotating a drive shaft (18) of an internal combustion engine (12) by combusting fuel with air from an air intake port (16). The shaft (22) of an electrical generator (20) is rotated in response to rotation of the drive shaft (18), for thereby generating electrical power. The traction motor (44) is operated from time to time using electrical power, to drive, or to aid in driving, the vehicle (10). An air mover (30) or compressor is operated in order to produce compressed air. The compressed air is routed from the air mover (30) to a cooling air input port (20i) of the generator (20) and to the air intake port (16) of the engine (12). According to a preferred mode of the method of the invention, the step of driving the air mover (30) includes the step of coupling mechanical rotation of the drive shaft (18) to a drive shaft of the air mover (30). This step may include the step of driving an intermediary device, which is preferably the generator (20) shaft. In an alternative mode of the method, the step of driving the air mover (30) includes the step of applying electrical energy to an auxiliary electrical motor (84) mechanically coupled to the air mover (30). This auxiliary electrical motor (84) may be driven from a battery which is recharged by the generator (20).

What is claimed is:

1. A hybrid electric vehicle comprising:
    an internal combustion engine which receives fuel, mixes the fuel with air from an air intake port to thereby form a fuel-air mixture, and combusts the fuel-air mixture to rotate a drive shaft;
    a traction motor for driving said vehicle;
    an electrical generator mechanically coupled to said drive shaft, for being driven by rotation thereof, for generating electrical power for use by said traction motor, said generator including a cooling air input port;
    an air mover pneumatically coupled to said air intake port and said cooling air input port, for creating a positive air pressure, and for coupling said positive air pressure to said air intake port and to said cooling air input port, said air mover being ultimately driven by said engine.

2. A vehicle according to claim 1, wherein said internal combustion engine is a diesel engine.

3. A vehicle according to claim 1, further comprising mechanical coupling means coupled to said drive shaft of said engine and to said air mover, so that said air mover is driven in response to mechanical rotation of said drive shaft.

4. A vehicle according to claim 3, wherein said mechanical coupling means comprises a shaft of said electrical generator.

5. A vehicle according to claim 1, further comprising electrical coupling means coupled to said air mover and ultimately coupled to said electrical generator.

6. A vehicle according to claim 5, wherein said electrical coupling means comprises a battery and an auxiliary electric motor.

7. A method for operating a hybrid electric vehicle, said method comprising the steps of:

rotating a drive shaft of an internal combustion engine by combusting fuel with air from an air intake port;

rotating an electrical generator in response to rotation of said drive shaft, for thereby generating electrical power;

from time to time, operating an electrical traction motor using said electrical power, for thereby driving said vehicle;

driving an air mover for compressing air; and routing compressed air from said air mover to a cooling air input port of said generator and to said air intake port of said engine.

8. A method according to claim 7, wherein said step of driving said air mover includes the step of:

coupling mechanical rotation of said drive shaft to a drive shaft of said air mover.

9. A method according to claim 7, wherein said step of driving said air mover includes the step of:

applying electrical energy to an auxiliary electrical motor mechanically coupled to said air mover.

* * * * *